United States Patent
Hadi et al.

(10) Patent No.: US 8,751,371 B2
(45) Date of Patent: *Jun. 10, 2014

(54) WEATHER DERIVATIVE VOLATILITY SURFACE ESTIMATION

(71) Applicant: Chicago Mercantile Exchange, Inc., Chicago, IL (US)

(72) Inventors: Muhammed Hadi, Chicago, IL (US); Ketan Patel, Hanover Park, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/010,050

(22) Filed: Aug. 26, 2013

(65) Prior Publication Data

US 2013/0346279 A1 Dec. 26, 2013

Related U.S. Application Data

(63) Continuation of application No. 13/591,413, filed on Aug. 22, 2012, now Pat. No. 8,538,851, which is a continuation of application No. 12/191,800, filed on Aug. 14, 2008, now Pat. No. 8,296,210.

(51) Int. Cl.
*G06Q 40/00* (2012.01)
*G06Q 40/04* (2012.01)
*G06Q 40/06* (2012.01)
*G06Q 40/08* (2012.01)

(52) U.S. Cl.
CPC .............. *G06Q 40/00* (2013.01); *G06Q 40/04* (2013.01); *G06Q 40/06* (2013.01); *G06Q 40/08* (2013.01)
USPC ............................................. 705/37; 705/36

(58) Field of Classification Search
CPC ....... G06Q 40/04; G06Q 40/06; G06Q 40/00; G06Q 40/08
USPC ...................................................... 705/37, 36
See application file for complete search history.

(56) References Cited

U.S. PATENT DOCUMENTS

| | | | |
|---|---|---|---|
| 7,149,715 B2 * | 12/2006 | Browne et al. | 705/36 R |
| 7,328,184 B1 * | 2/2008 | Krause | 705/37 |
| 7,630,931 B1 * | 12/2009 | Rachev et al. | 705/36 R |
| 7,689,498 B2 * | 3/2010 | Rodgers et al. | 705/37 |
| 7,813,988 B2 | 10/2010 | Levin et al. | |
| 2007/0294158 A1 * | 12/2007 | Patel et al. | 705/36 R |

OTHER PUBLICATIONS

Caballero et al., Long Memory in Surface Air Temperature: Detection, Modeling, and Application to Weather Derivative Valuation, Climate Research, vol. 21: 127-140, Jun. 14, 2002.*
Caballero et al., Long Memory in Surface Air Temperature; Detection, Modeling, and Application to Weather Derivative Valuation, Climate Research, vol. 21: 127-140, Jun. 14, 2002.

* cited by examiner

*Primary Examiner* — James A Vezeris
*Assistant Examiner* — Clifford Madamba
(74) *Attorney, Agent, or Firm* — Banner & Witcoff, Ltd.

(57) ABSTRACT

Systems and methods are provided for determining the volatility of weather derivative option contracts. Volatility levels are initially determined with conventional methods. Unreliable volatility levels are then replaced with futures contracts volatility levels. If the futures contracts volatility levels are not available or appear unreliable, meteorological volatility levels are utilized. The data may be reduced to a three dimensional surface and used when determining margin account requirements.

16 Claims, 4 Drawing Sheets

WEATHER DERIVATIVE VOLATILITY SURFACE ESTIMATION

The present application is a continuation of U.S. patent application Ser. No. 13/591,413 filed Aug. 22, 2012, which is a continuation of U.S. patent application Ser. No. 12/191,800 filed Aug. 14, 2008, now U.S. Pat. No. 8,296,210, both entitled "Weather Derivative Volatility Surface Estimation," the entire disclosures of which are hereby incorporated by reference.

FIELD OF THE INVENTION

Embodiments of the present invention relate to methods and systems for determining volatility of weather based financial instruments.

DESCRIPTION OF THE RELATED ART

Options contracts or options give their owners the right but not the obligation to buy, in the case of call options, or to sell, in the case of put options, an underlying good, such as a company's stock or bond, at a specified "strike" price for a preset amount of time. When the preset amount of time has lapsed, the option "expires."

Exemplary options contracts include weather derivatives. Weather derivatives include financial instruments that can be used by organizations or individuals as part of a risk management to reduce risk associated with adverse or unexpected weather conditions. Derivative contracts based on heating degree days may be geared to how much below 65 degrees Fahrenheit the temperature averages in a given city in a given month. Derivative contracts based on monthly snowfall may be geared toward the amount of snowfall recorded in a given month in a designated location. Other exemplary weather derivative contracts are listed at the Chicago Mercantile Exchange and described on the exchange's website.

The volatility of options contracts can be an important factor when determining credit and liquidity exposure and setting margin requirements for a clearing member or firm. Because of the nature of weather derivatives, models used to determine the volatility of other options contracts are often not accurate for determining the volatility of weather derivatives. For example, it is not uncommon to expect large changes in volatility of some contracts even as the maturity date approaches. In contrast, weather events often become more certain as the maturity date approaches.

There is a need in the art for improved systems and methods for determining the volatility of weather derivatives and setting margin requirements.

SUMMARY OF THE INVENTION

Embodiments of the present invention overcome problems and limitations of the prior art by providing systems and methods for determining the volatility of weather derivative option contracts. Black Scholes or Jewson models may be used to create initial volatility values. Unreliable volatility levels may be replaced with futures contracts volatility levels. If the futures contracts volatility levels are not available or appear unreliable, meteorological volatility values are utilized. Meteorological volatility values may be determined from historical and forecast meteorological data. In one embodiment, a seasonally adjusted GARCH model is utilized. The data may be reduced to a three dimensional surface and used when determining margin account requirements.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
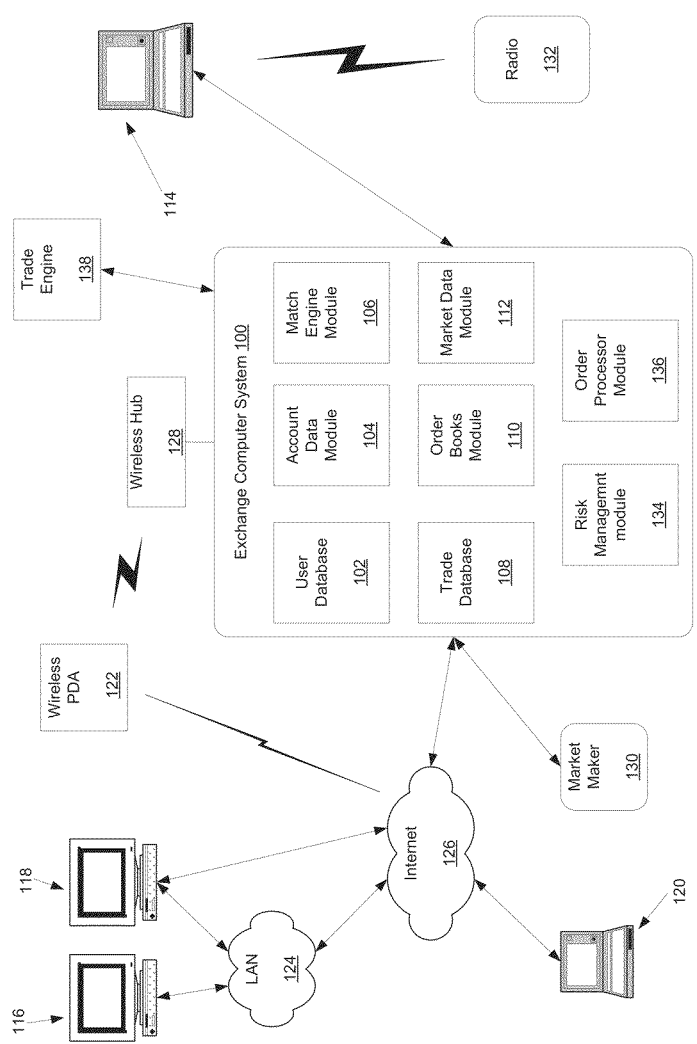
FIG. 1 shows a computer network system that may be used to implement aspects of the present invention.

Aspects of the present invention may be implemented with computer devices and computer networks that allow users to perform calculations and exchange information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
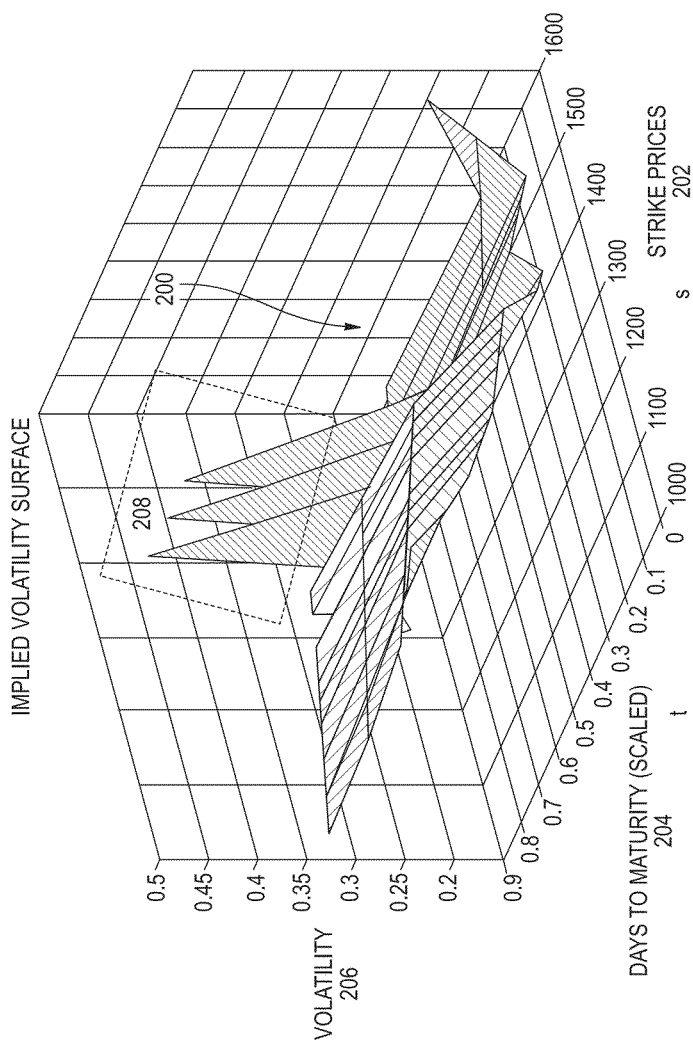
FIG. 2 illustrates an implied volatility surface for a collection of weather derivative option contracts.

FIG. 2 illustrates an implied volatility surface 200 for a collection of weather derivative option contracts. A strike price axis 202 represents strike prices. A days to maturity axis 204 represents scaled days to maturity and volatility axis 206 represents volatility of sigma. Surface 200 may be created with a conventional volatility model, such as a Black Scholes or Jewson model. Option prices for weather derivatives that are farther out of the money and for contracts having maturity dates further away can be somewhat erratic and may not result in accurate volatility levels when used with existing models. For example, region 208 represents spikes in the volatility of weather derivatives having relatively far away maturity dates.

Figure 3:
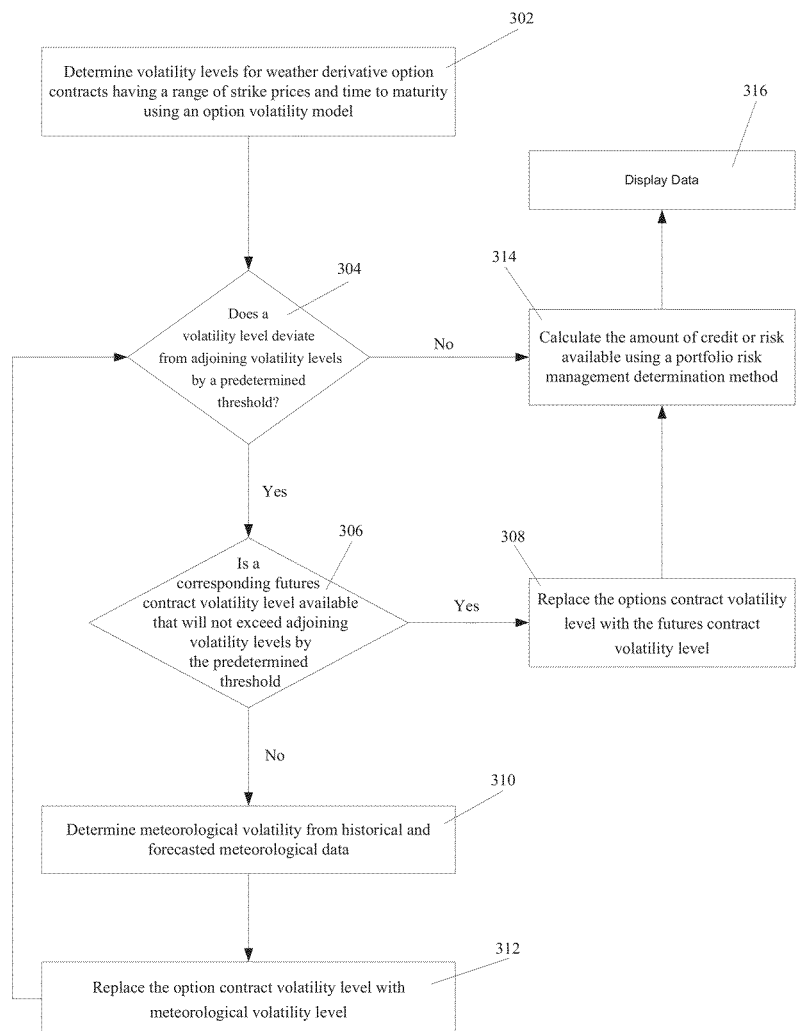
FIG. 3 illustrates a method of determining volatility for a group of weather derivative option contracts, in accordance with an embodiment of the invention.

FIG. 3 illustrates a method that may be used to determine volatility in accordance with an embodiment of the invention. First, in step 302 volatility levels for weather derivative option contracts having a range of strike prices and time to maturity are determined using an option volatility model. In various embodiments of the invention volatility may be calculated via a Black Scholes or Jewson model from weekly weather calls/puts. Calculating implied volatility for pricing puts and calls from a Black Scholes model can be done as follows:

$$P(S, T) = Ke^{-rT}\Phi(-d_2) - S\Phi(-d_1).$$

$$C(S, T) = S\Phi(d_1) - Ke^{-rT}\Phi(d_2)$$

where $$d_1 = \frac{\ln(S/K) + (r + \sigma^2/2)T}{\sigma\sqrt{T}}$$

$$d_2 = \frac{\ln(S/K) + (r - \sigma^2/2)T}{\sigma\sqrt{T}} d_1 - \sigma\sqrt{T}.$$

Here $\Phi$ is the standard normal cumulative distribution function.

where: P=put price, C=call price, S=underlying asset price, K=strike price, r=risk free rate, sigma=implied volatility and T=remaining time to maturity/expiration.

If we know P or C since the market determined the price, intra-day or at close of business we also know: S, K, r and T. Those values can be plugged in and a search performed to find the closest sigma that produces the realized P or C. The search algorithm can be any of many widely used algorithms such as the bisection method or Newton-Raphson method.

Next, in step 304 it is determined whether a volatility level deviates from adjoining volatility levels by a predetermined threshold. Such a deviation may result from insufficient or unreliable data. Region 208 (shown in FIG. 2) corresponds to volatility levels that deviate from adjoining volatility levels by a threshold. One skilled in the art will appreciate that different thresholds may be chosen for different volatility surfaces and purposes. When a deviation is found, next in step 306 it is determined whether a corresponding futures contract volatility level is available that will not exceed adjoining volatility levels by the predetermined threshold. When a futures contract volatility level is available, in step 308 the options contract volatility level is replaced with a futures contract volatility level.

When a suitable futures contract volatility level is not available, in step 310 meteorological volatility is determined from historical and forecast meteorological data. Price volatility is related to weather volatility for weather derivative contracts. As time to maturity approaches various combinations of actual and forecasted data are used. For example, when considering a ten day contract based on temperature, at 10 days to maturity forecasted data issued. At one day to maturity nine days of actual data and one day of forecasted data will be used. As the maturity date approaches more actual and less forecasted data is used so volatility tends to decline.

In one embodiment, a GARCH model may be used to forecast volatility up to 30 days annualized that correspond to the weather derivative option contract volatilities determined in step 302. An exemplary GARCH model is as follows:

$$\sigma_t^2 = \alpha_0 + \alpha_1 a_{t-1}^2 + \beta_1 \sigma_{t-1}^2, \quad \text{GARCH (1,1)}$$

where $$a_t = \sigma_t \epsilon_t,$$

$$\alpha_0 > 0, \alpha_i \geq 0, \beta_j \geq 0,$$

$$(\alpha_i + \beta_i) < 1$$

and epsilon_t is a sequence of independent and identically distributed random variables with mean 0 and variance 1.

This GARCH model could also be used to find the volatility across a cross sectional slice of the volatility surface where by the volatility of the strike or strike/current price (for puts) or current price/strike (for calls) time series could be used to forecast forward a future volatility level for that strike or strike/current price (for puts) or current price/strike (for calls). As such, any forward missing volatility term points in the surface will be filled. A smoothing algorithm could be used such that the forward forecast may span (10 to 30 days) and the average of the forward volatiles could be taken as the forecasted volatility for that strike or strike/current price (for puts) or current price/strike (for calls). Note that the relationship between puts and calls could be valued via an arbitrage free assumptions called put-call parity based on the equation below:

$$C(t) + K \cdot B(t,T) = P(t) + S(t)$$

where
C(t) is the value of the call at time t,
P(t) is the value of the put,
S(t) is the value of the underlying weather future,
K is the strike price, and
B(t,T) value of a treasury/risk free security that matures at time T.

In various embodiments the GARCH model may be adjusted for seasonality. To adjust for seasonality a year may be divided into quarters and it may be assumed that a stable relationship exists across the same quarter so that a better forecast can be obtained by using the current quarter's volatility as compared to the last year's same quarter. To do this, instead of regressing the current volatility against yesterday's (t−1) volatility is regressed against the volatility (or average volatility over say 10, 20 or 30 days depending on which gives a more statistically significant and stable relationship) at the same time but last year. Thus:

$$\sigma_t^2 = (\alpha_{0,1} + \alpha_{1,1} a_{t-1}^2 + \beta_{1,1} \sigma_{t-1}^2) * s_1 + (\alpha_{0,2} + \alpha_{1,2} a_{t-2}^2 + \beta_{1,2} \sigma_{t-2}^2) * s_2 + (\alpha_{0,3} + \alpha_{2,3} a_{t-3}^2 + \beta_{1,3} \sigma_{t-3}^2) * s_3 + (\alpha_{0,4} + \alpha_{2,4} a_{t-4}^2 + \beta_{1,4} \sigma_{t-4}^2) * s_4$$

where $$a_t = \sigma_t \epsilon_t,$$

t: represent today
t−1: represents the same time today, but last year and so on to t−2,3,4 s1,s2,s3,s4: are seasonality switches such that when one of them is 1 the others are zero (for example if month is January, February or March then s1=1 and s2=s3=s4=0 and so on)

Sigma_t−1: may be an average or a spot volatility.

Alphas and betas: are estimated via regression.

Next, in step 312 the options contract volatility level is replaced with the meteorological volatility level. After step 312, control is returned to step 304 and the loop is repeated until there are no volatility levels that deviate from adjoining volatility levels by the predetermined threshold.

Interpolation techniques may then be used to create a solid surface. For example, a fifth or sixth degree polynomial that fits the discrete volatility points perfectly and would be able to forecast intermediate points. This is an example of an n-degree polynomial where f(x) would be volatility and x is time. This may be repeated for volatiles across time with constant strike prices $$f(x) = a_n x^n + a_{n-1} x^{n-1} + \ldots + a_2 x^2 + a_1 x + a_0$$

In an alternative embodiment, x is strike price and time is kept constant and f(x) represents implied volatility. If prices were used then fit a polynomial to the price series, then the forecasted intermediate price may be used to reverse out an implied volatility number via Black Scholes or Jewson models. Other interpolation techniques can be used instead of polynomial fitting, such as quadratic or cubic splines or linear interpolation.

In step 314 an amount of credit risk available to a trader or other entity may be calculated using a portfolio risk management determination method and the derived volatility levels. An exemplary portfolio risk management determination method is the Standard Portfolio Analysis of Risk (SPAN®) method. The Standard Portfolio Analysis of Risk (SPAN®) method was developed by the Chicago Mercantile Exchange for calculating performance bond requirements. Risk management analysis may be performed across multiple financial instruments at multiple exchanges including pending orders at the multiple exchanges. In one implementation, a clearing firm may set a predetermined risk threshold for a trading entity and use the Standard Portfolio Analysis of Risk (SPAN®) method to determine whether the new order would cause the trading entity to exceed the predetermined threshold. The predetermined threshold may be dynamic and based in part on conditions external to the trading entity's orders, conditions external to financial instrument and/or conditions at an exchange other than the exchange that received the new order. The threshold may be periodically recalculated by the entity that received the new order.

The Standard Portfolio Analysis of Risk (SPAN®) method or other portfolio risk management determination methods may calculate a higher risk level when the new order is a buy order for a financial instrument that has a high correlation to an existing buy order for a different financial instrument. In various embodiments the portfolio risk management determination method may determine a risk associated with all buy and/or sell orders being matched. In other embodiments of the invention, the portfolio risk management determination method may determine the risk associated with a subset of all buy and/or sell orders being matched. The portfolio risk management determination method may be used to set margin account requirements. A margin account requirement is the money that a trader must deposit into his or her trading account in order to trade options.

Figure 4:
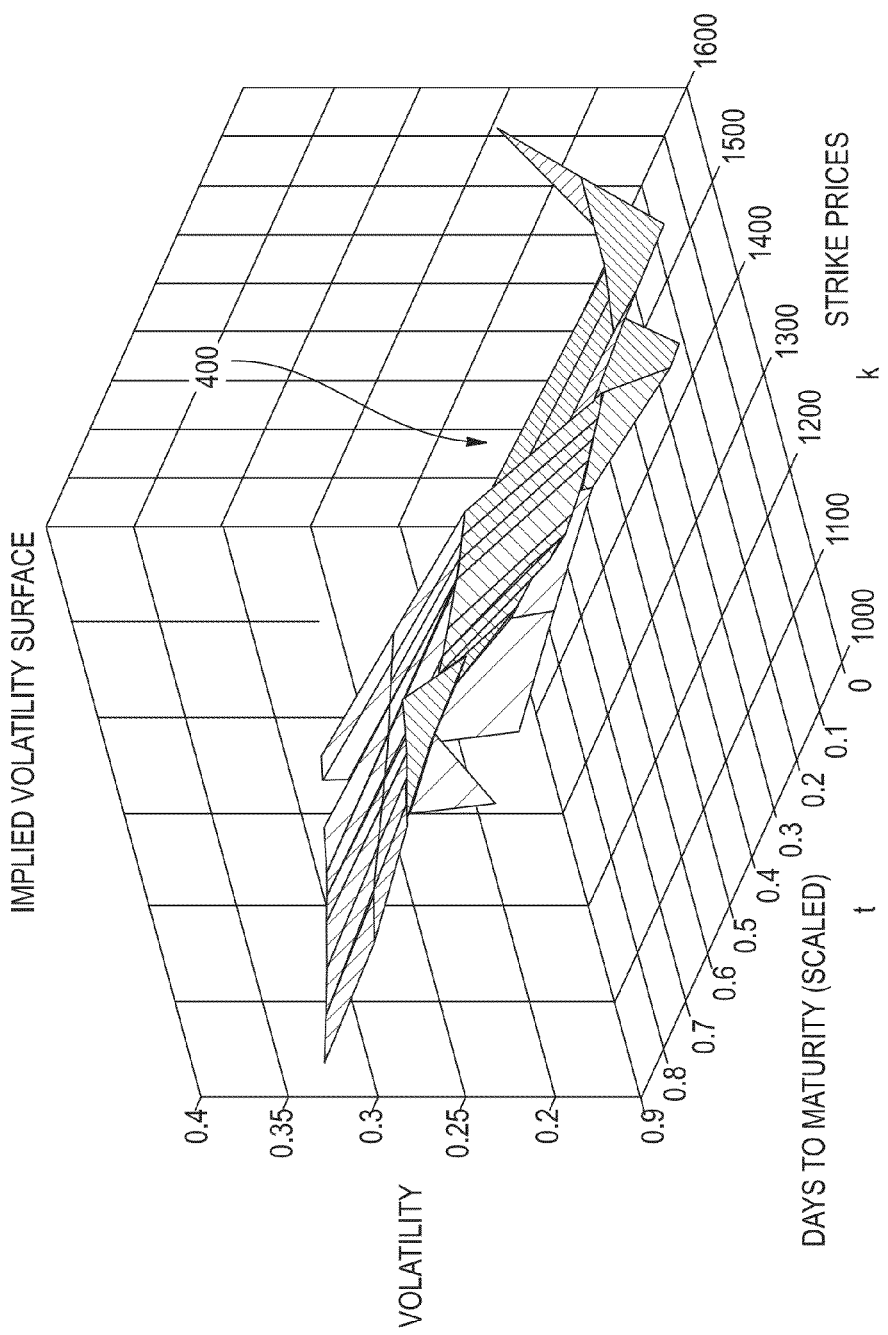
FIG. 4 illustrates an implied volatility surface for a collection of weather derivative option contracts that has been modified with the method shown in FIG. 3, in accordance with an embodiment of the invention.

The amount of credit or risk available and/or any of the volatility data may be displayed on a display device in step 316. FIG. 4 illustrates an implied volatility surface 400 for a collection of weather derivative option contracts that has been modified with the method shown in FIG. 3. For example, the spikes in region 208 (shown in FIG. 2) have been eliminated. Of course, in some embodiments the data may be used in one or more other processes and may not be displayed to users.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A method of determining a volatility for a group of weather derivative products; the method comprising:
   (a) determining at a processor volatility levels for weather derivative option contracts having a range of strike prices and a range of times to maturity using an option volatility model;
   (b) identifying at the processor any of the weather derivative option contract volatility levels that deviate from adjoining volatility levels corresponding to weather derivative option contracts by a predetermined threshold;
   (c) replacing the volatility levels identified in (b) with weather derivative futures contracts volatility levels for corresponding futures contracts;
   (d) displaying an implied volatility surface; and
   (e) calculating the amount of credit or risk available using a portfolio risk management determination method and at least one of the volatility levels.

2. The method of claim 1,
   wherein the option volatility model comprises a Black Scholes model.

3. The method of claim 1,
   wherein the option volatility model comprises a Jewson model.

4. The method of claim 1,
   wherein the implied volatility surface includes volatility levels for at least some of the weather derivative option contracts and at least either a volatility level for a weather derivative futures contract from (c).

5. A method of determining a margin account requirement for a portfolio that includes at least one weather derivative product, the method comprising:
   (a) determining at a processor volatility levels for weather derivative contracts having a range of strike prices and a range of times to maturity using an option volatility model;
   (b) identifying at the processor any of the weather derivative option contract volatility levels that deviate from adjoining volatility levels corresponding to weather derivative option contracts by a predetermined threshold;
   (c) replacing the volatility levels identified in (b) with futures contracts volatility levels for corresponding futures contracts;
   (d) calculating at a processor the amount of credit or risk available using a portfolio risk management determination method and at least one of the volatility levels; and
   (e) displaying an implied volatility surface.

6. The method of claim 5,
   wherein the portfolio risk management determination method comprises the Standard Portfolio Analysis of Risk method.

7. The method of claim 5,
   wherein the option volatility model comprises a Black Scholes model.

8. The method of claim 5,
   wherein the option volatility model comprises a Jewson model.

9. The method of claim 5,
   where (c) comprises determining meteorological volatility using a seasonally adjusted GARCH model.

10. A non-transitory computer-readable storage medium containing computer-executable instructions for performing the steps comprising:
    (a) determining at a processor volatility levels for weather derivative contracts having a range of strike prices and a range of times to maturity using an option volatility model;
    (b) identifying weather derivative contract volatility levels that deviate from adjoining volatility levels corresponding to weather derivative option contracts by a predetermined threshold;
    (c) replacing the volatility levels identified in (b) with futures contracts volatility levels for corresponding futures contracts;
    (d) displaying an implied volatility surface; and
    (e) calculating the amount of credit or risk available using a portfolio risk management determination method and at least one of the volatility levels.

11. The computer-readable medium of claim 10, further including computer-executable instructions for performing:
    (d) generating a three-dimensional display of the volatility levels.

12. The computer-readable medium of claim 10,
    wherein the option volatility model comprises a Black Scholes model.

13. The computer-readable medium of claim 10,
    wherein the option volatility model comprises a Jewson model.

14. The computer-readable medium of claim 11,
    wherein the three-dimensional display comprises an implied volatility surface.

15. The computer-readable medium of claim 10, further including computer-executable instructions for performing:
    (d) calculating the amount of credit or risk available using a portfolio risk management determination method and at least one of the volatility levels.

16. The computer-readable medium of claim 15,
    wherein the portfolio risk management determination method comprises the Standard Portfolio Analysis of Risk method.

* * * * *